UNITED STATES PATENT OFFICE.

THOMAS L. MILLER, OF PEARSALL, TEXAS.

VETERINARY MEDICINE.

SPECIFICATION forming part of Letters Patent No. 287,701, dated October 30, 1883.

Application filed July 11, 1883. (No specimens.)

*To all whom it may concern:*

Be it known that I, THOMAS LATIN MILLER, a citizen of the United States, residing at Pearsall, county of Frio, State of Texas, have invented a new and useful Compound Screw-Worm Liniment, the use and mode of composition of which compound will be fully described in the subjoined specification.

This invention relates to that class of remedies used as a cure or antidote for diseases and wounds caused by screw-worms and all kinds of parasites in or on stock and poultry, and also a preventive of the reattack of the blow-fly until the wound is effectually healed.

The ingredients of my screw-worm liniment are: three (3) parts carbolic acid; four (4) parts infusion of elder, made by taking one pound of elder-leaves to one quart of water; macerate twenty-four hours; then heat to a boiling-point and press the liquid from the leaves; two (2) parts infusion of cactus, made by taking one pound of cactus to one quart of water; macerate twenty-four hours; then heat to a boiling-point, and press the liquid from the cactus; two (2) parts of infusion of prickly-pear, made by taking one pound of pear leaf to one quart of water; macerate twenty-four hours; then heat to a boiling-point, and extract the liquid; one (1) part pine-tar, and two (2) parts castile-soap, substantially as described. Place the carbolic acid in an iron vessel. Then add the soap and heat to a boiling temperature, stirring the mixture continually. Then heat the infusion of elder, cactus, and prickly-pear, and add them to the acid and soap. Stir the mixture one-half an hour. Then stir in the tar thoroughly, and the compound mixture is ready for use.

My screw-worm liniment is applied externally until the wound is healed. It may be applied with wool or cotton saturated with the liniment, and inserted into the wound or poured in the same. The above applies to screw-worms. For all other parasites, by taking equal parts of the liniment and soft water, mix and apply with a cloth or brush.

After long experience in the use of my screw-worm liniment, I have invariably found that it will destroy all kinds of parasites or vermin in or on stock and poultry, and prevent the reattack of the blow-fly, and effectually heal the wound.

What I claim, and desire to secure by Letters Patent of the United States, is—

The herein-described composition of matter to be used for the destruction of all kinds of parasites on stock and poultry and healing the wounds caused by the same, consisting of carbolic acid, infusion of elder, infusion of cactus, infusion of prickly-pear, pine-tar, and castile-soap, in the proportions specified.

In testimony whereof I affix my signature in presence of two witnesses.

THOMAS LATIN MILLER.

Witnesses:
J. L. RIDER,
JOHN T. ARMS.